C. P. TATE.
WEDGE KEY.
APPLICATION FILED MAR. 4, 1908.

916,219.

Patented Mar. 23, 1909.

Witnesses
Hugh H. Ott
W. Allen

Inventor
Charles P. Tate
By Victor J. Evans
Attorney

UNITED STATES PATENT OFFICE.

CHARLES P. TATE, OF LUDINGTON, LOUISIANA.

WEDGE-KEY.

No. 916,219.  Specification of Letters Patent.  Patented March 23, 1909.

Application filed March 4, 1908. Serial No. 419,231.

*To all whom it may concern:*

Be it known that I, CHARLES P. TATE, a citizen of the United States, residing at Ludington, in the parish of Calcasieu and State of Louisiana, have invented new and useful Improvements in Wedge-Keys, of which the following is a specification.

The invention relates to an improvement in wedge pins designed primarily for use as a machine element, the invention residing particularly in a means whereby the pin, after being properly positioned, is prevented from accidental displacement.

The main object of the present invention is the provision of a wedge pin of ordinary form and having the ordinary mechanical functions, the pin being formed with a groove having a bottom wall inclining reversely with relation to the wedge formation of the pin, the use of the improved wedge pin contemplating the seating of a mechanically operable device in said groove to prevent displacement of the wedge pin after it has been properly seated.

The invention will be described in the following specification, reference being had particularly to the accompanying drawings, in which:—

Figure 1:
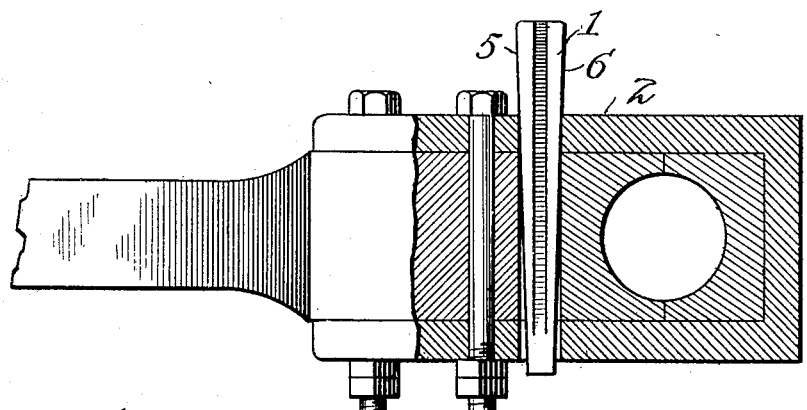
Figure 2:
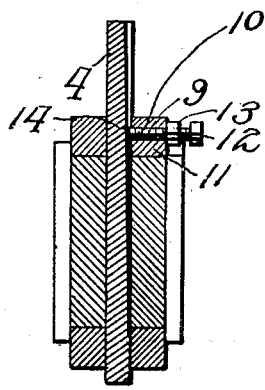
Figure 3:
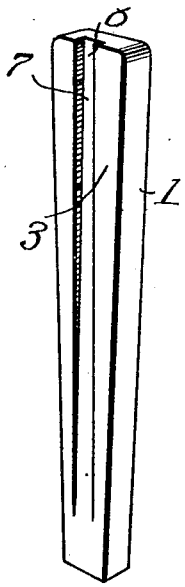

Figure 1 is a view in longitudinal section, partly in elevation, illustrating the use of the wedge pin in connection with a cross head coupling, the wedge pin being shown in elevation. Fig. 2 is a transverse section through the same, showing particularly means whereby the wedge pin is retained in position. Fig. 3 is an enlarged perspective view of the wedge pin removed.

Referring particularly to the accompanying drawings, my improved wedge pin 1 is shown as having its ordinary function as a machine element in connection with a cross head coupling 2. The detailed structural formation of the coupling head or the usual junction of the wedge pin connected therewith are wholly immaterial so far as the present invention is concerned, and which invention it will be understood is designed primarily toward providing a means for securing the wedge pin against accidental displacement when once applied. The wedge pin 1 is of the usual structural formation, that is of equal sectional dimensions throughout in one transverse direction, whereby its faces 3 and 4 are arranged in parallel relation, and wedge shaped in the other transverse dimension, whereby the edges 5 and 6 incline with relation to each other in the usual manner.

In carrying out the details of the present invention one of the parallel faces of the wedge pin, as 3, is formed with a centrally disposed longitudinally arranged groove 7, hereinafter termed the wedge groove. This groove opens through the upper or thicker edge of the wedge pin, but does not extend entirely to the reduced end. The bottom wall 8 of this groove inclines with relation to the surface 3 throughout its length, being at the lower or smaller end of the wedge pin in coincidence with the surface 3, and inclining therefrom toward the upper or thicker end of the wedge pin, at which latter point the groove 7 is of greatest depth. It will, therefore, be seen that the groove 7 is of greatest depth at the upper end of the wedge, so that the material of the wedge pin underlying the groove is of least thickness at the upper edge of the wedge pin and of greatest thickness at the lower end thereof. The bottom wall of the groove thus inclines reversely with relation to the inclination of the wedge sides 5 and 6 of the wedge pin, as will be clearly shown in Fig. 1 of the drawings. By reason of having the bottom wall of the wedge groove coincide with the surface of the pin in one end of the pin, I am enabled to secure the full function of the groove and yet avoid weakening the pin at the reduced end.

In conjunction with the wedge pin described I contemplate the use of a manually adjustable holding means, which is preferably in the form of a set screw 9 of any usual or preferred character adapted to be screwed or otherwise inserted through an opening 10 formed in a part 11 of the machine element with which the wedge pin coöperates. The set screw is provided with the usual head 12 and lock nut 13, the inner terminal 14 of said screw being adapted for seating in the groove 7 of the wedge pin. After application of the wedge pin the set screw 9 is inserted so that its terminal projects into the groove 7 and bears against the bottom wall 8 thereof, the lock nut being adjusted to maintain the set screw in this position. In this position the set screw will prevent any accidental displacement of the wedge pin, owing to the fact that the wall 8 of the groove below said set screw inclines outwardly relative to the pin or toward the set screw.

The wedge of the present invention is designed primarily for use as a machine element, and it is adapted for any and all situations in which wedge pins may be used. The material of the parts is also unimportant so far as the present invention is concerned, any desired material being contemplated. In this connection it is to be noted that the wedge pin is an article entire in itself, as the set screw with which I have shown it combined is of the ordinary type and forms no material part of the present invention.

Having thus described the invention what is claimed as new, is:—

1. A wedge pin having relatively inclined edges and parallel faces, one of said faces being formed with a groove having its bottom wall inclined with relation to the face in which it is formed and coinciding with said face at one end of the groove.

2. A wedge pin having relatively inclined edges and parallel faces, one of said faces being formed with a groove having its bottom wall inclined with relation to the face in which it is formed and coinciding with said face adjacent the smaller end of the pin.

3. A wedge pin having relatively inclined edges and parallel faces, one of said faces being formed with a groove having its bottom wall coinciding with the face adjacent the smaller end of the pin, said bottom wall inclining from the face toward the opposite end of the groove.

In testimony whereof I affix my signature in presence of two witnesses.

CHARLES P. TATE.

Witnesses:
FRANK E. POWELL,
HOUSTON BARNES.